Oct. 11, 1927.
V. A. NOBLE
VEHICLE BODY CONSTRUCTION
Filed Nov. 19, 1923
1,644,892
2 Sheets-Sheet 2
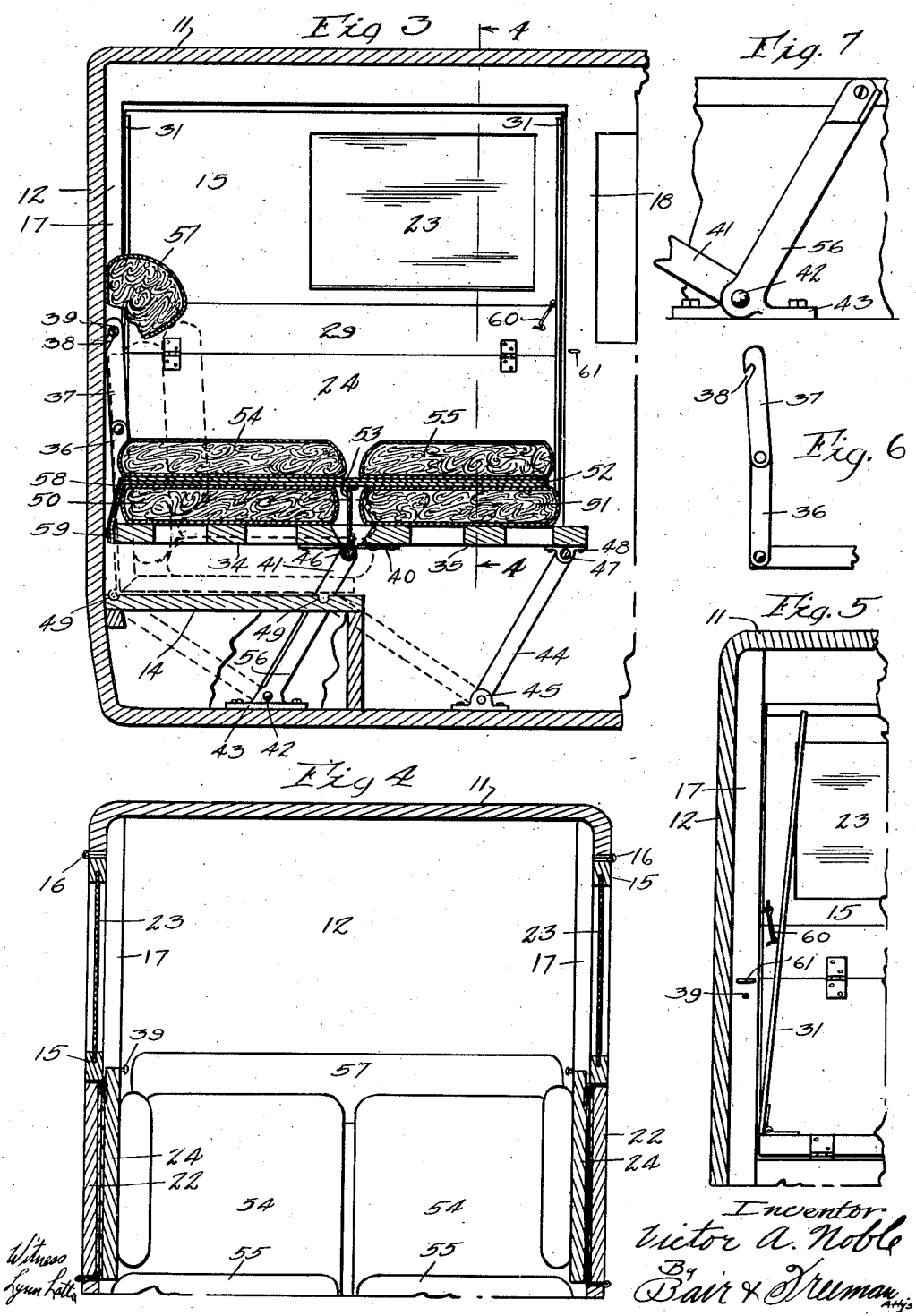

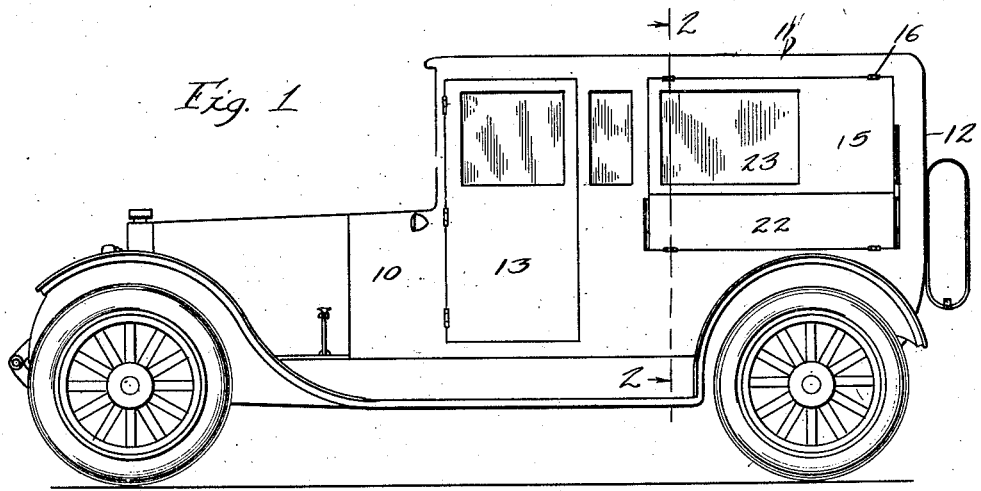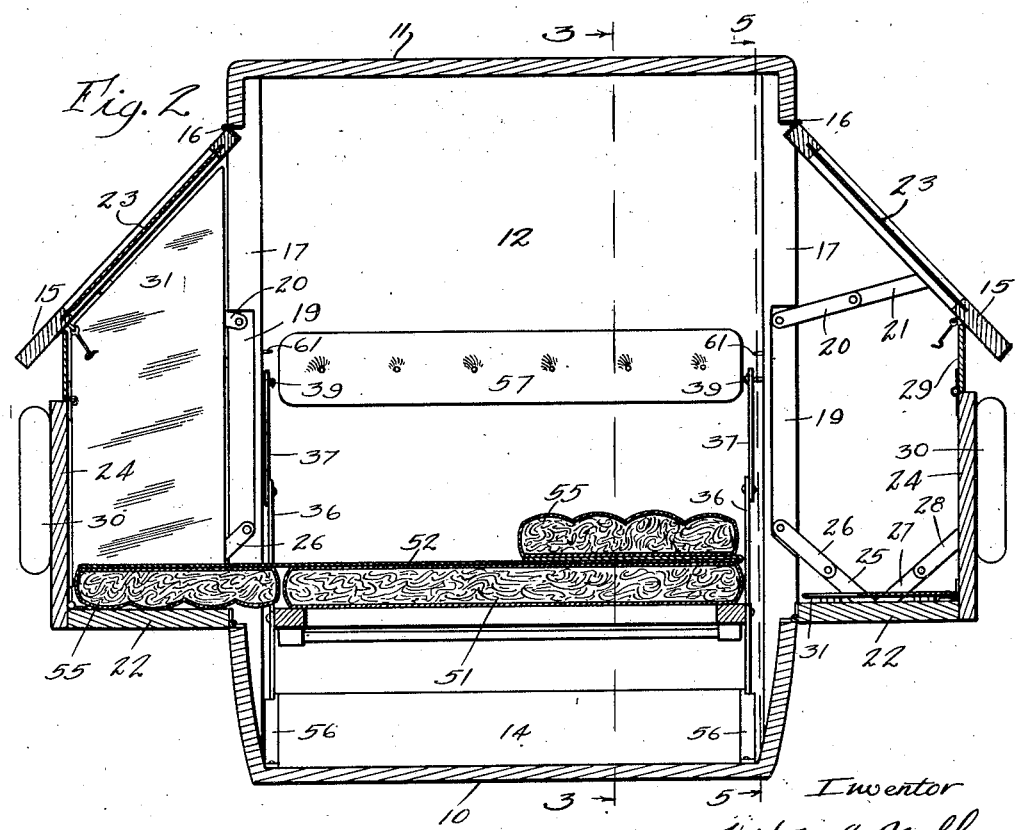

Patented Oct. 11, 1927.

1,644,892

UNITED STATES PATENT OFFICE.

VICTOR A. NOBLE, OF LAURENS, IOWA.

VEHICLE BODY CONSTRUCTION.

Application filed November 19, 1923. Serial No. 675,546.

My invention relates to the form of vehicle and particularly automobile body construction having parts so arranged that a bed for sleeping may be readily arranged.

More particularly, it is my purpose to provide an automobile body having parts so connected adjustable as to serve in the ordinary way and capable of being rearranged so as to provide a comfortable sleeping bed.

A further object is to provide such a structure in a motor vehicle body of the closed type.

Still a further object is to provide in such a structure a combination seat and bed with novel mounting and supporting means therefor.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of an automobile equipped with a body construction embodying my invention.

Figure 2 is a transverse, detailed, sectional view of the same with the parts partially adjusted for forming a bed.

Figure 3 is a detailed, sectional view taken on the line 3—3 of Figure 2.

Figure 4 is a sectional view taken on the line 4—4 of Figure 3.

Figure 5 is a detailed, sectional view taken on the line 5—5 of Figure 2.

Figure 6 is a detailed elevation of a hanger member on the seat and bed; and

Figure 7 is an elevation illustrating one of the pivoted legs and the supporting bracket therefor.

I may say in a general way that I provide in a motor vehicle body of the closed type, a construction whereby the rear seat cushions may be readily shifted from position for serving as a seat to position for serving as a bed, and to provide adjustable members forming part of the car body and adapted to serve to form part of the walls and part of the bed support, or to be folded to position where they are out of the way or serve as part of the regular car body when the body is used in the ordinary way.

The bed is arranged crosswise of the car when the parts are in the expanded or open position.

In the accompanying drawings, I have used the reference numeral 10 to indicate generally the body of a motor vehicle having the top 11 and the back 12.

The car is designed to be entered after opening the doors 13 provided at the front of the body in the usual way.

In the rear part of the body is a fixed frame 14, shown in section in Figure 3, for the rear seat and adapted to support the cushion thereof.

Before describing the combination seat and bed proper, I will explain the construction of the side walls of the body. The side panel at the rear part of the body 10 is provided at its rear portion on each side of the car with a section 15 hinged at its upper edge, as at 16, to the main portion of the side of the body.

There are provided just rearwardly and forwardly respectively of the section 15 upright frame elements 17 and 18 shown for instance in Figures 2, 3 and 4. These upright frame members are provided with rabbets 19 (see Figure 2). Pivotally supported in the upper portion of each rabbet 19 is a link 20. The link 20 has pivoted to one end another link 21, which in turn is pivoted to the section 15, so that when the section 15 is swung outwardly from vertical position on its hinges, it may stand inclined outwardly and downwardly as shown in Figure 2.

The section 15 preferably has a pane of glass 23 inserted therein.

Hinged at its lower edge below the section 15 on each side of the body is another movable section 22, which is designed normally when the body is closed to stand upright, as shown in Figure 4, in such manner that the sections 15 and 22 close the side of the car.

Hinged to the upper edge of the section 22, as shown in Figure 4, is a section 24. The section 24 is hinged at a point below its upper edge as shown in Figure 4, so that when the section 22 is swung from vertical position to its horizontal position, as illustrated in Figure 2, the section 24 may stand upright and may overlap the outer edge of the section 22 as illustrated.

At each end of each section 22, a link 25 is pivoted thereto. A similar link 26 is pivoted to the link 25 and to the frame member 17 or 18 as the case may be, the construction being illustrated in Figure 2.

Links 26 and 25 fold into the rabbet 19 when the sections 15 and 22 are in their vertical position shown in Figure 4.

Similarly, there is pivoted to each end of each section 22 a link 27, which in turn is pivoted to a link 28. Each link 28 is pivoted to one end of the section 24, so that the links may support and connect the parts, as illustrated in Figure 2, for holding them in position when the device is opened up in position to serve as a bed.

The section 24 has hinged to it at what is its upper edge when it is open, as shown in Figure 2, a narrow section 29, which extends upwardly to the section 15 when the parts are expanded.

On what is the inside of the section 24, when the section 24 is folded inwardly, as shown in Figure 4, is a cushion or the like 30 for the side of the seat. Hinged to the inner side of the section 22 at each end thereof is a thin end member 31, which when the parts are unfolded to serve as a bed, is swung upwardly as illustrated in Figures 1 and 2 to close the ends of the partial compartment formed by the sections 15, 29, 24 and 22.

When the members 31 are thus swung upwardly, they prevent the members 29 from swinging inwardly and are held by friction. Locking devices may be provided if desired.

It will thus be seen that by the construction hereinbefore described, there are provided parts which may serve as portions of the sides of the closed car body when the car is used in the ordinary way or may be unfolded to the position shown in Figure 2, which affords a compartment projecting at the sides of the car body for a substantial distance.

I shall now describe the seat and bed portion of the device.

Standing rearwardly from the back cushion of the rear seat when the latter is in upright position is a slatted frame 34 shown for instance in Figure 3. Hinged to the frame 34 is a similar slatted frame 35, which when the structure is used as a seat rests on the frame 14.

The frames 34 and 35 are hinged together, so that the frame 34 may stand upright and the frame 35 in horizontal position when the device is used as a seat or the two may be swung to horizontal position as shown in Figure 3.

The seat position of the parts just described is illustrated by dotted lines in Figure 3.

Pivoted to what is the rear part of the frame 34 when the latter is in horizontal position at the ends thereof are links 36, which are in turn pivoted to links 37, having hook notches 38 at their free ends.

On the frame members 17 are pins 39 illustrated for instance in Figures 2 and 3. Pivotally connected with the hinges 40, which connect the frames 34 and 35, are legs or links 41, which are pivoted at their lower ends, as at 42 (see Figure 3) to brackets 43 on the bottom of the car body. The legs or links 41 are pivoted to the hinges 40 adjacent to the ends of the frames 34 and 35. Pivoted to the under side of the frame 35 near each end thereof is a link or leg 44, which is also pivoted to a bracket 45 on the floor of the car.

When the parts are in position for use as a seat, the legs 41 and 44 occupy the dotted line positions shown in Figure 3.

The leg 41 may be pivoted to the hinges 40 by being mounted on a pintle rod 46 forming part of the hinges 40 and the legs 44 pivoted to a rod 47 mounted in brackets 48 in the underside of the frame 35.

The upper part of the frame 14 is provided with notches 49 to receive the rods 46 and 47 when the device is collapsed and folded up to serve as a seat.

Resting against the frame 34 is a suitable cushion 50 which stands in vertical position, as illustrated by dotted lines in Figure 3, when the device is used as a seat, and in horizontal position as shown in full lines in said figure, when the device is used as a bed.

Resting on the frame 34 is a similar cushion 51. The upper surfaces of the cushions 50 and 51, when they are considered in their positions shown in Figure 3 for use as a bed are covered by a canvas or flexible member 52, shown for instance in Figure 2. A flexible strip 53, shown in Figure 3, connects the transverse central part of the canvas 52 with the rod 46 for the better holding of the cushions in position. The canvas 52 is fastened to the covers of the cushions 50 and 51.

There are provided cushions 54 and 55, which when the cushions 50 and 51 are in their horizontal position shown in Figure 3 may rest above the cushions 50 and 51. The canvas 52 is long enough at its ends to be folded over the cushions 54 and 55, and the extended portions are secured to the cushions 54 and 55. The cushions 54 and 55 are only half the length of the cushions 50 and 51, so that they may be folded outwardly, as illustrated at the left-hand side of Figure 2 to form extensions of the cushions 50 and 51 at the ends thereof resting on the section 22 when the device is extended to form a bed.

There is provided a heavy supporting bracket 56 for the legs 41 inclined upwardly and forwardly as shown in Figures 3 and 7. Thus when the device is opened to serve as a bed, the hook portions of the links 37 are extended over the pins 39 for receiving the rear part of the frame 34.

The frames 34 and 35 are also supported by the legs 41 and 44 as shown in Figure 3. The end cushion members 54 and 55 rest on the sections 22 as illustrated for instance in Figure 2, in which the left-hand cushion 55 is shown in its full unfolded position.

The device is of sufficient length crosswise of the vehicle body to form a comfortable bed.

The structure of the parts will perhaps be more fully illustrated by an explanation of the steps in folding up the device from its position for use as a bed to the position of the parts when the car is used in the ordinary way.

When it is desired to fold up the bed, each of the cushions 55 and 54 is folded upwardly and inwardly from the position illustrated for instance at the left-hand side of Figure 2 to the position illustrated by the cushion 55 at the right-hand part of Figure 2.

The cushions 54 and 55 will then rest above the cushions 50 and 51 as illustrated in Figure 3. The links 37 are then grasped and raised slightly to clear the pins 39. The rear part of the cushions 50 and 54 are swung upwardly and the links 36 and 37 are allowed to swing down out of the way.

It will, of course, be understood, that the parts are so constructed as to allow clearance during the folding and unfolding operations.

The cushions 54 and 50 are then swung upwardly a little farther and the frames 34 and 35 and the cushions supported thereon are swung rearwardly on the legs 41 and 44 until the cushions 50 and 54 assume their dotted line positions shown in Figure 3, and the cushions 55 and 51 swing rearwardly and downwardly to their dotted line positions shown in Figure 3, with the frame 35 resting on the frame 14.

There is provided a cushion 57 mounted on the inside of the rear wall of the vehicle body to stand just above the cushions 50 and 54 when they are in seat position.

It might be mentioned that the portions of the member 52, which are secured to the cushion 54 have extensions 58 adapted to fasten over buttons 59 at the rear of the frame 34, after the cushions 54 are folded over on the cushions 51 for more conveniently holding all the parts in proper position. The seat having been folded back to position for use as a seat, the end members 31 are folded down against the sections 22.

The sections 29 are then folded down against the inner sides of the members 24. The members 24 are then folded down above the sections 29 and the members 31 and the sections 22 are then swung up to vertical position as shown in Figure 4. The sections 15 are then swung down to vertical position also, as shown in Figure 4.

The members 15 are provided with hooks 60 to engage the screw eyes 61 on the frame members or uprights 17 and 18 for holding the sections 15 in upright position.

It will be noted that on account of the manner in which the sections 24 are hinged to the sections 22, it is the fact that when the sections 22 and 15 are in upright position, the lower edges of the sections 15 overlap the upper edges of the sections 24 to prevent any outward swinging of the sections 24 and the sections 22 hinged thereto.

Thus it will be seen from the foregoing description, that I have provided an automobile body having its parts so constructed and arranged that the body may be used in the usual way for driving or touring.

When, however, it is desired, the parts of the body may be unfolded or opened out as it were for forming a comfortable bed extending crosswise of the body.

This is accomplished by first unhooking the hooks 60 from the screw eyes 61. The member 15 is then swung outwardly and upwardly from its position shown in Figure 4 to its position shown in Figure 2, the links 20 and 21 being extended to aligned position. The section 22 is then swung outwardly from its position shown in Figure 4 to its position shown in Figure 2. The section 24 is then swung upwardly from position resting on the section 22 above the end members 31 to its vertical position shown in Figure 2.

It will be understood that the links 26 and 25 have thus moved to aligned position for supporting the section 22 horizontally and the links 27 and 28 have been thus aligned for properly supporting the section 24. The narrow section 29 is then swung upwardly to engage the section 15.

At this point, it may be mentioned that the screw eyes by which the hooks 60 are secured to the sections 15 serve to engage the upper edge of the section 29 for assisting in holding it in position. The members 31 are then swung upwardly from the position illustrated for instance at the right-hand side of Figure 2 to the position illustrated at the left-hand side of Figure 2.

The sections 34 and 35 are swung upwardly and forwardly from their dotted line positions shown in Figure 3, until the section 35 is in its full line position shown in Figure 3, whereupon the section 34 is swung rearwardly and downwardly from vertical position to horizontal position.

The links 37 are hooked over the pins 39 for supporting the rear part of the frame 34. The forward parts of the frames 34 and 35 are supported by the legs 41 and 45 and the brackets 56.

The cushions 54 and 55 are swung upwardly and laterally in the car to rest on the sections 22. The canvas or other extensions 58 may be buttoned over the buttons 59, and the device is ready for use as a bed.

The advantages of having a body, which can be readily changed to serve as a bed are largely obvious from the foregoing structure. Such a structure is, of course, particularly adapted for tourists, who prefer to camp out rather than to stay at hotels.

For those who desire to drive long hours, the parts can be adjusted so that one traveler may lie on the bed while another drives.

The device herein shown may, of course, be used for carrying an invalid, and could be adapted for use as an ambulance.

Some changes, of course, may be made in the details of the structure and arrangement of the various parts of my device without departing from its essential features, and it is my intention to cover by my claims, any modified forms of structure or use of mechanical equivalents, which may be reasonably included within their scope.

I claim as my invention:

1. In a device of the class described, a vehicle body having opposite side members capable of being folded outwardly to form supporting elements, an adjustable seat and bed member comprising frames pivoted together, and means for supporting said frames in a position to form part of a seat and back therefor, capable of movement into position for supporting said frames in aligned horizontal position substantially in the same plane with and directly opposite to said side members when in their bed supporting position, whereby the adjustable bed and seat member then forms a connecting means between the side members and cooperates therewith to form a bed.

2. In a device of the class described, a vehicle body having side members capable of being folded outwardly to form supporting elements, an adjustable seat and bed member, comprising frames pivoted together, and means for supporting said frames in position to form part of a seat and back therefor, capable of movement into position for supporting said frames in aligned horizontal position substantially in the same plane with and directly opposite to said horizontally arranged side members when in their bed supporting position and cooperating therewith to form a bed, cushions secured to said frames, and cushions having a hinge connection with the first cushions at the ends thereof.

3. In a vehicle body, a plurality of movable sections, comprising sections hinged to the main body and movable from position forming parts of the body side to positions for forming top and bottom members respectively of opposite side extensions for the vehicle, another section and end members hinged to one of said first sections and capable of movement to upright position or to position folded against the section to which they are hinged, an adjustable seat and bed member comprising frames pivoted together, and means comprising legs pivoted to the body floor and the frames, for supporting said frames in position to form part of a seat and a back therefor and capable of movement to position for supporting said frames in aligned horizontal position, between the bottom members of the side extensions to cooperate therewith to form a bed.

4. In a vehicle body, a plurality of movable sections, comprising sections hinged to the main body and movable from position forming parts of the body side to positions for forming top and bottom members respectively of opposite side extensions for the vehicle, another section and end members hinged to one of said first sections and capable of movement to upright position or to position folded against the section to which they are hinged, an adjustable seat and bed member comprising frames pivoted together, and means for supporting said frames in position to form part of a seat and a back therefor and capable of movement to position for supporting said frames in aligned horizontal position between the bottom members of the side extensions to cooperate therewith to form a bed, cushions secured to said frames and cushions having a hinged connection with said first cushions at the ends thereof.

5. A vehicle body having a rear seat and a removable back cushion therefor, said body provided with an opening in the side wall of the body portion only opposite an end of said seat, a closure for said opening adapted to be extended beyond the side of the vehicle body to provide room for a bed portion cooperating with and as a longitudinal addition to said seat to form a bed and means for supporting said removable back cushion adjacent said rear seat also to cooperate with said closure in forming a bed extending lengthwise transversely of the vehicle.

6. A vehicle body having a transverse seat and an opening in the side portion of the body of the car only opposite the end of said seat and a closure for said opening providing room beyond the side of the body of the car for a bed portion adapted to cooperate with said seat to form a bed extending transversely of the vehicle.

Des Moines, Iowa, November 9, 1923.

VICTOR A. NOBLE.